(12) United States Patent
Sacilotto, Jr.

(10) Patent No.: US 10,769,195 B2
(45) Date of Patent: Sep. 8, 2020

(54) MEDIA ASSET AGGREGATION IN A MULTI-DATABASE ENVIRONMENT

(71) Applicant: Avid Technology, Inc., Burlington, MA (US)

(72) Inventor: Roger P. Sacilotto, Jr., Saugus, MA (US)

(73) Assignee: Avid Technology, Inc., Burlington, MA (US)

( * ) Notice: Subject to any disclaimer, the term of this patent is extended or adjusted under 35 U.S.C. 154(b) by 342 days.

(21) Appl. No.: 15/883,723

(22) Filed: Jan. 30, 2018

(65) Prior Publication Data

US 2019/0236152 A1 Aug. 1, 2019

(51) Int. Cl.
| | |
|---|---|
| *G06F 17/00* | (2019.01) |
| *G06F 16/438* | (2019.01) |
| *G06F 16/48* | (2019.01) |
| *G06F 16/41* | (2019.01) |
| *G06F 16/432* | (2019.01) |
| *G11B 27/031* | (2006.01) |
| *G11B 27/10* | (2006.01) |
| *H04N 21/235* | (2011.01) |
| *H04N 21/84* | (2011.01) |
| *H04N 21/854* | (2011.01) |
| *H04N 21/858* | (2011.01) |

(52) U.S. Cl.
CPC ............ *G06F 16/438* (2019.01); *G06F 16/41* (2019.01); *G06F 16/433* (2019.01); *G06F 16/48* (2019.01); *G11B 27/031* (2013.01); *G11B 27/10* (2013.01); *H04N 21/2353* (2013.01); *H04N 21/84* (2013.01); *H04N 21/854* (2013.01); *H04N 21/858* (2013.01)

(58) Field of Classification Search
CPC ........ G06F 16/40; G06F 40/166; G06F 16/48; G06F 16/955; G06F 3/0481; G06F 3/04817
See application file for complete search history.

(56) References Cited

U.S. PATENT DOCUMENTS 7,752,186 B2 7/2010 Abajian
2005/0234985 A1* 10/2005 Gordon ................ G11B 27/105
(Continued)

OTHER PUBLICATIONS

Avid Interplay MAM, Design, Technology and Applications, Avid Technology, Inc., 2013.

*Primary Examiner* — Truong V Vo
(74) *Attorney, Agent, or Firm* — Oliver Strimpel (57) ABSTRACT

Within a media production environment, multiple variants of a given media asset may be stored on various systems within the environment. The described production environment tracks whether a newly created asset is a variant of an original asset within the environment, and, if so, assigns it a linkage key that it shares with the original and any other variants of the original. When responding to an asset search request, responsive assets may include assets sharing a linkage key. These are assembled into an aggregate asset that is returned as a single asset among the search results. Aggregate assets include descriptive metadata copied from its constituent variants and shown in the search results to represent the asset within the search results. Using links within the aggregate asset, the application automatically retrieves a compatible variant of the selected asset, if one is present within the production environment.

19 Claims, 3 Drawing Sheets

(56) References Cited

U.S. PATENT DOCUMENTS

2011/0225156 A1    9/2011  Pavlik
2013/0188708 A1*  7/2013  Rusert .................. H04N 19/597
                                                    375/240.12
2017/0109419 A1*  4/2017  Farre Guiu ........... G06F 3/0484

* cited by examiner

MEDIA ASSET AGGREGATION IN A MULTI-DATABASE ENVIRONMENT

BACKGROUND

During the course of producing a media project, such as a film or a musical performance, the contributing media assets may be converted into a number of different formats that are adapted to particular purposes. For example, source video captured by a camera at high resolution may be converted into a compressed form suitable for use in a video editing system, or for streaming to a portable device. Such heterogeneous implementations of the same content are often stored in different asset management systems, and are processed independently and with very different algorithms that are tied to the type of the asset management systems that host the various implementations. Thus, separate steps must be performed by a user to retrieve or play back each implementation, even if their content is the same.

The different ways in which such assets are handled is also manifested in the methods the systems deploy to find media essence for a given asset. Each system typically has its own, unique method for mapping assets to their corresponding essence files.

There is a need to streamline the processing of media assets during the media production pipeline.

SUMMARY

In general, the methods, systems, and computer program products described herein respond to a media search request and streamline the results. A collection of individual assets that are variants of each other and share the same content are grouped into a single aggregate asset. When accessing an aggregate asset, media processing applications are able to locate compatible asset variants automatically. The use of aggregate assets also simplifies asset references.

In general, in one aspect, a method of responding to a media search request from a user of a media processing application comprises: in response to a search query entered by a user of the media processing application, searching a plurality of systems within a media production environment; locating a plurality of media assets that are responsive to the search query, wherein the plurality of located media assets includes a first asset including a first linkage key stored on a first system of the plurality of systems, and a second asset including a second linkage key stored on a second system of the plurality of systems; comparing the first linkage key with the second linkage key, and, if the first linkage key is the same as the second linkage key, grouping the first asset and the second asset into an aggregate asset wherein the aggregate asset includes: the first linkage key; links to the first asset and to the second asset; and a copy of at least a portion of descriptive metadata included within at least one of the first asset and the second asset; and including the aggregate asset within search results presented to the user that are responsive to the media search request, wherein the aggregate asset is represented within the search results by the copied portion of the descriptive metadata; and wherein in response to a request from the user to access the aggregate asset, the media processing application automatically accesses one of the first asset and the second asset that is compatible with the media processing application.

Various embodiments include one or more of the following features. The plurality of systems within a production environment include at least two of a media asset management system, a production asset management system, and a data logging system. The content represented by at least one track of the second asset is the same as content represented by at least one track of the first asset. The at least one track of the first asset includes video of the represented content and the at least one track of the second asset includes audio of the represented content. The first asset and the second asset have the same number of tracks, and each of the tracks of the first asset represents the same content as a corresponding track of the second asset. The second asset differs from the first asset by at least one of: the encoding scheme; the degree and type of compression; the system on which it is stored; and the metadata schema. The second system is different from the first system. The search results presented to the user include at least one asset that does not represent an aggregate asset. The media processing application automatically accessing a compatible one of the first asset and the second asset includes using the link to the first asset included within the aggregate asset to access the first asset and to determine whether a metadata schema of the first asset is compatible with the media processing application; if the metadata schema of the first asset is compatible with the media processing application, automatically selecting and accessing the first asset; and if the first asset is not compatible with the media processing application: using the link to the second asset included within the aggregate asset to access the second asset and to determine whether a metadata schema of the second asset is compatible with the media processing application; and if the metadata schema of the second asset is compatible with the media processing application, automatically selecting and accessing the second asset. A given metadata field is present in both the first asset and the second asset, and the system accesses a mapping template that specifies a priority order for copying values of metadata fields from individual assets into an aggregate asset; and determines whether the copied at least a portion of the descriptive metadata included within at least one of the first asset and the second asset is to be copied from the first asset or to be copied from the second asset in accordance with the priority order specified by the mapping template. The given metadata field is an asset name. The priority order specified by the mapping template specifies that an asset name of an asset stored in a media asset management system is copied as a first priority. The priority order specified by the mapping template specifies that if an asset management system is not present within the media production environment, an asset name is to be copied from a production asset management system.

In general, in another aspect, a method of responding to a media search request in a media production environment comprising a plurality of systems includes: receiving a media search query from a user of a media processing application; in response to receiving the media search query, searching the plurality of systems; locating a plurality of media assets stored on the plurality of systems that are responsive to the search query, wherein the located plurality of media assets includes a first variant media asset that includes a linkage key, and a second variant media asset that includes the linkage key and represents at least a portion of content represented by the first variant media asset; grouping the first variant media asset and the second variant media asset into an aggregate asset, wherein the aggregate asset includes: the linkage key; links to the first variant media asset and to the second variant media asset; and a copy of at least a portion of descriptive metadata included within at least one of the first variant media asset and the second variant media asset; including a representation of the aggregate asset among search results returned to the user, wherein the representation includes the copied descriptive metadata; and wherein in response to a request from the user to access the aggregate asset, enabling the media processing application to automatically: if at least one of the first variant asset and the second variant asset is compatible with the media processing application, select and access one of the first variant asset and the second variant asset that is compatible with the media processing application; and if neither the first variant asset nor the second variant asset is compatible with the media processing application, provide an indication to the user that no compatible asset corresponding to the aggregate asset has been found.

Various embodiments include one or more of the following features. Using the linkage key to search the plurality of systems, locating a third variant media asset stored on the plurality of systems, wherein the third variant asset includes the linkage key and represents at least a portion of the content represented by the first variant media asset; and grouping the third variant media asset with the first variant media asset and the second variant media asset into the aggregate asset. The third variant media asset is compatible with the media processing application, and enables the media processing application to access the third variant media asset automatically.

In general, in a further aspect, a computer program product comprises: non-transitory computer-readable storage with computer program instructions stored thereon, wherein the computer program instruction, when processed by a computer, instruct the computer to perform a method of responding to a media search request from a user of a media processing application, the method comprising: in response to a search query entered by a user of the media processing application, searching a plurality of systems within a media production environment; locating a plurality of media assets that are responsive to the search query, wherein the plurality of located media assets includes a first asset including a first linkage key stored on a first system of the plurality of systems, and a second asset including a second linkage key stored on a second system of the plurality of systems; comparing the first linkage key with the second linkage key, and, if the first linkage key is the same as the second linkage key, grouping the first asset and the second asset into an aggregate asset wherein the aggregate asset includes: the first linkage key; links to the first asset and to the second asset; and copy of at least a portion of descriptive metadata included within at least one of the first asset and the second asset; and including the aggregate asset within search results presented to the user that are responsive to the media search request, wherein the aggregate asset is represented within the search results by the copied portion of the descriptive metadata; and wherein in response to a request from the user to access the aggregate asset, the media processing application automatically accesses one of the first asset and the second asset that is compatible with the media processing application.

DETAILED DESCRIPTION

Figure 1:
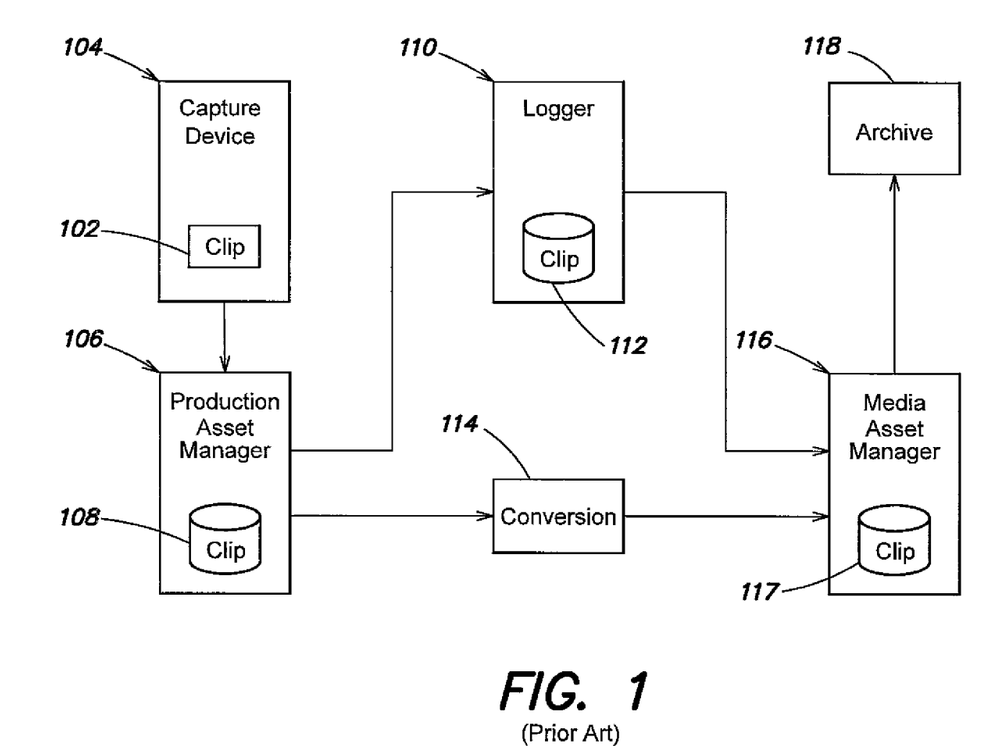
FIG. 1 is a high-level block diagram of a prior art production environment.

FIG. 1 illustrates aspects of a typical media production workflow. An original media clip 102 is captured by capture device 104, such as a camera or audio recorder. The clip may be stored temporarily within the capture device, or may be sent directly to production asset manager 106. The production asset manager stores the clip as clip variant 108 that includes metadata required in the production process. Subsequently, the clip is sent to logger system 110 where metadata pertaining to the clip is entered. The logger stores variant 112 of the clip and builds a metadata record of its own, structured according a data model specific to the logger system. The clip also undergoes conversion (114) as it is sent to media asset manager 116 as clip variant 117, which also sends it for longer term storage to archive 118. As logging is performed, the data logged may be sent to the archive where it is stored in association with the clip. A particular production environment may generate and store additional variants of a clip. For example, in newsroom production, a newsroom variant may include metadata pertaining to the channel, server, and time to air. Motion graphics assets may exist as vector graphics variants and raster graphics variants. Thus, typical production environments have three or more variants of a particular clip. When a project is published, it may be rendered into small, lightweight formats suitable for streaming over wired or wireless networks, or into various higher quality formats required for different types of playback venues. These constitute additional variants that may be stored in the media asset manager archive or on other platforms.

As used herein, a media asset management system comprises a repository for storing and managing media files, including video and audio. They act as databases that are customized to the special requirements of media storage and retrieval, and include search and archiving capabilities. They can span multiple physical systems, or be implemented in the Cloud. A production asset management system, on the other hand, is tailored to the storage of media assets during the course of a particular production. As such, rapid retrieval is prioritized, as well as the ability to manage and track various stages of the production workflow, including multiple revisions and versions of assets. Such systems may include workflow automation for movement, transcoding, and media publishing. As used herein, an asset refers to the elements from which a composition is created. Typically, such asserts are clips, which may include media, i.e., video and/or audio, or graphics such as motion graphics, referred to as computer generated imagery (CGI). Assets may include multiple tracks.

Each of the systems in a production environment deploys its own metadata schema adapted to the functions of the type of system. A data logger system is specialized to facilitate the manual addition of descriptive metadata to media assets. The media data is not itself edited in such systems. Other specialized functions are implemented in newsroom systems, where rapid retrieval is key and the metadata schemas include information relating to graphic systems, playout systems, and teleprompters. In a media asset management system, assets have a linkage to an archive system, and may include metadata fields that record different methods of user customization, e.g., rules for the data so that a metadata entry interface can include a pull-down menu limiting certain parameter values to a pre-specified set of values. In addition, the fields may contain compound values. Production asset management systems, on the other hand, only include simple key value pairs. Some generic metadata fields are shared by all systems, such as an asset name field. However, users may rename assets when they are moved from one system to another, so a given asset may have different names in different systems. Furthermore, in addition to different descriptive metadata, each system has its own distinct structural metadata that defines the media format, compression, resolution, and other technical parameters, and which are required in order to access the content of an asset.

When wishing to perform a certain action with the media project, a user launches a media processing application, such as a video editor or digital audio workstation, that is to work with the project to perform the desired action, and searches for the asset to be worked on. In typical production environments, such as that described above, a search for the asset returns multiple variants, however, in general, only one variant is recognized and readable by the application. In current workflows, the user must adopt a trial and error approach, attempting to open each of the received variants until the variant that works with the application is tried. This is inefficient, and slows down the editing process, especially when a trial and error procedure needs to be adopted repeatedly for a series of assets in a composition.

Figure 2:
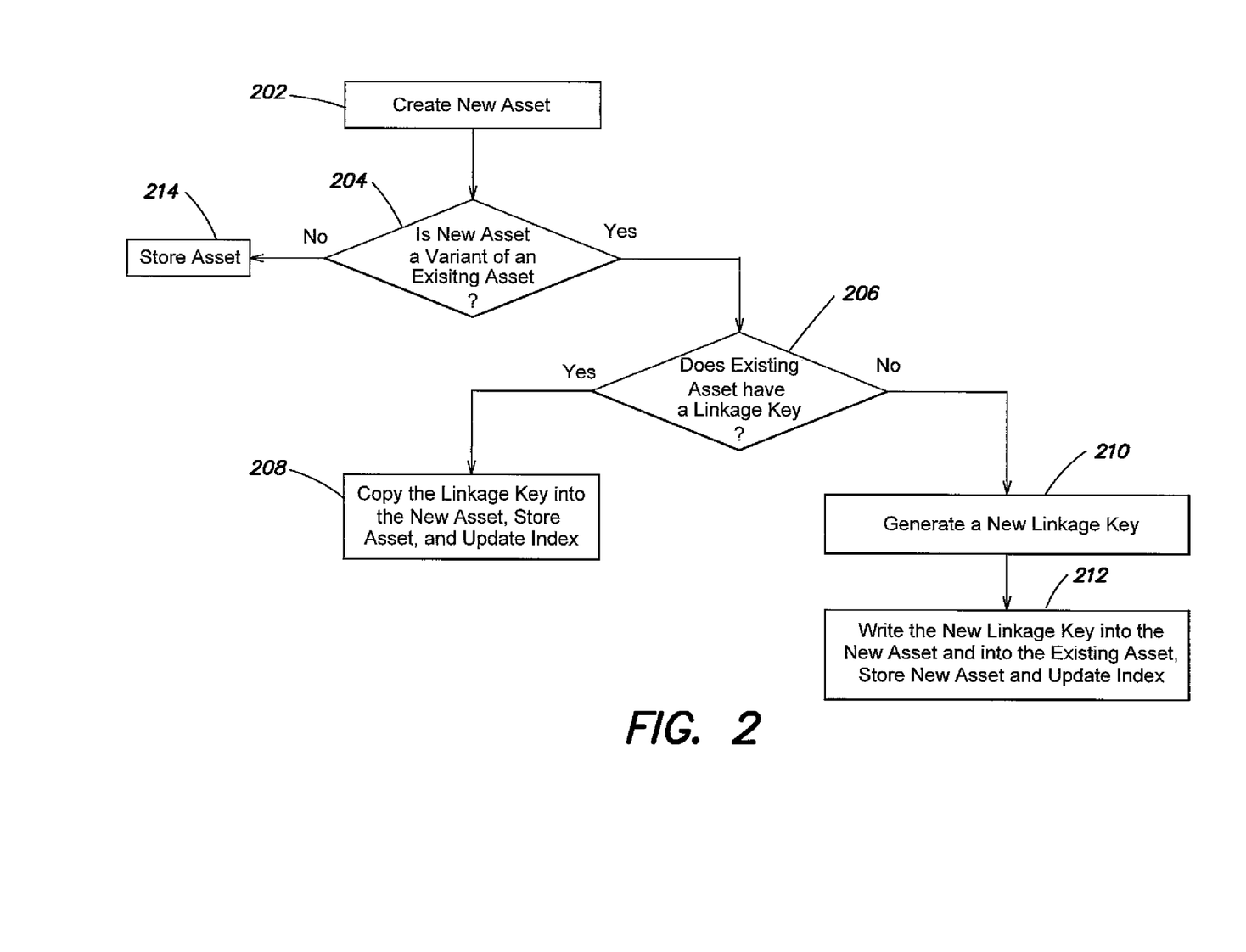
FIG. 2 is a flow diagram illustrating the use of linkage keys for defining aggregate assets in a production environment.

These problems are overcome by handling the collection of individual asset variants as a single aggregate asset. An aggregate asset is defined by its content, such that each member of the aggregate represents the same content. A variant may represent the entire content, or may represent only a subset of the media types representing the content. For a composition asset comprising picture and sound, a variant member of an aggregate asset for the composition may include both picture and sound, or just picture or just sound for the composition. Thus, one variant may include a video track of a given content and a second variant may include an audio track of the given content, and a third variant may include both the video track and the audio track of the given content. However, a version in which the picture is cropped would not qualify as a variant since information is removed by this process. On the other hand, a high definition full screen and a standard definition letterbox format are variants since the same content has been expanded to fill the high definition screen format without loss of information. An aggregate asset may be defined by the content acquired of a given scene by a single capture device. Each variant shares a given set of images and/or sounds, but the media essence may vary between variants as a result of different encoding, e.g., original resolution, a proxy, or a compressed version. Other variations between variants include metadata schemas (discussed above), and storage locations. In certain cases, an aggregate asset may not itself stored in a persistent fashion, and is assembled on-the-fly in response to a request. Each aggregate asset is identified by a unique linkage key. The key is stored with each of the individual member variants of the aggregate set. Software running within the production environment creates and maintains aggregate assets using an identifier specific to aggregates called a linkage key, as illustrated in FIG. 2. When a new asset is created (202), the software that creates the new asset informs the system as to whether the process by which the new asset was created generates an asset that conforms to the definition of a variant or whether it does not conform (204). For example, a new asset created by a transcode or a resampling operation would qualify as a variant, but a cropped version would not. If the new asset is a variant of the existing asset, the system checks to see if the existing asset already has a linkage key (206). If it does, the linkage key of the existing asset is supplied and stored with the new asset (208), and an entry for the new asset including the linkage key is added to a search back end index. If the existing asset does not have a linkage key, a new key is generated (210), and is stored with the existing asset as well as with the variant (212). The search back end index is also updated, adding the linkage key to the entry for the existing asset, and adding an entry, also with the linkage key, for the new asset. If, on the other hand, the new asset is not a variant of an existing asset, it is stored without a linkage key (214) and a corresponding entry is added to the search back end index for the asset. The collection of variants with the same linkage key represents a virtual aggregate asset. Once an asset becomes part of an aggregate, it remains part of the aggregate even when it is edited, e.g., to change its name or other properties, as long as the source content remains unchanged.

When a search is performed, all assets responsive to the search are returned. If more than one returned asset includes the same linkage key (i.e., they are variants of each other), the group sharing the same linkage ID is replaced by an aggregate object, and a single aggregate asset is then returned by the search. For example, a search may locate 500 variants responsive to the search term. If 400 of these comprise pairs of assets sharing the same linkage key, the system groups these into 200 aggregate assets and returns 200 aggregate assets and 100 non-aggregate assets, i.e., a total of 300 results. The distinction between an aggregate asset or a simple asset is not of importance to the user; if a user determines that it is one of the aggregate assets that they wish to use, then if a variant corresponding to the media application being deployed by the user is present, that will be the one that is automatically located and used, without any further input required from the user. If no such variant exists and no conversion from another variant is possible, the user is informed that no suitable asset has been found.

An aggregate asset is built up from its individual variants by copying into the aggregate asset the links to each of the individual variants that share the linkage key of the aggregate asset. This enables the user's application to retrieve the required variant, which in turn, has links to the asset's essence. In addition, an aggregate asset includes descriptive metadata copied from at least one of the variants. The aggregation of the metadata from its constituent individual variants may involve the use of a mapping template. This may specify a priority order for determining which variant to use as the source for metadata fields that appear in more than one of the variants belonging to an aggregate asset. For example, an asset name is included in metadata of each of the variants, but the template may specify that the name appearing in the media asset manager variant is the one that is copied into the aggregate asset. Implementation of the template may result in an aggregate containing copied metadata from only a single variant. When it is useful to display metadata fields that appear only in a subset of the variants, metadata from more than one, or even all of the variants is copied to the aggregate asset. For example, production-specific fields, such as color space, may appear only in the variant stored in the production asset manager. The metadata fields that are copied into the aggregate interface are chosen to provide sufficient information to the user to enable the user to select the desired asset from among the set of results returned by the search. At a minimum, that aggregate includes a name of the aggregate asset. Other useful metadata fields commonly shown in the search user interface in association with each search result are the topic and key words.

In certain contexts, it is desirable to associate data with an asset in a persistent fashion. For example, if a variant that the user might expect to be present is missing, a note to this effect may be included in the aggregate. This would save the user from looking for such a variant and instead retrieve the asset from the archive.

When a user selects an aggregate asset from among the search results, the application being used by the user attempts to find a variant that is compatible with it. In certain implementations, it locates the appropriate variant by examining each of the variant links stored in the aggregate for information specifying the type of the variant. In other implementations, the user application follows each of the links and uses the metadata associated with the variant itself to determine its type. This may be performed in a single step, and eliminates the trial and error in finding a compatible variant that is referred to above. In some circumstances, more than one variant member of the aggregate asset is compatible with an application, in which case the application may work with either one.

Figure 3:
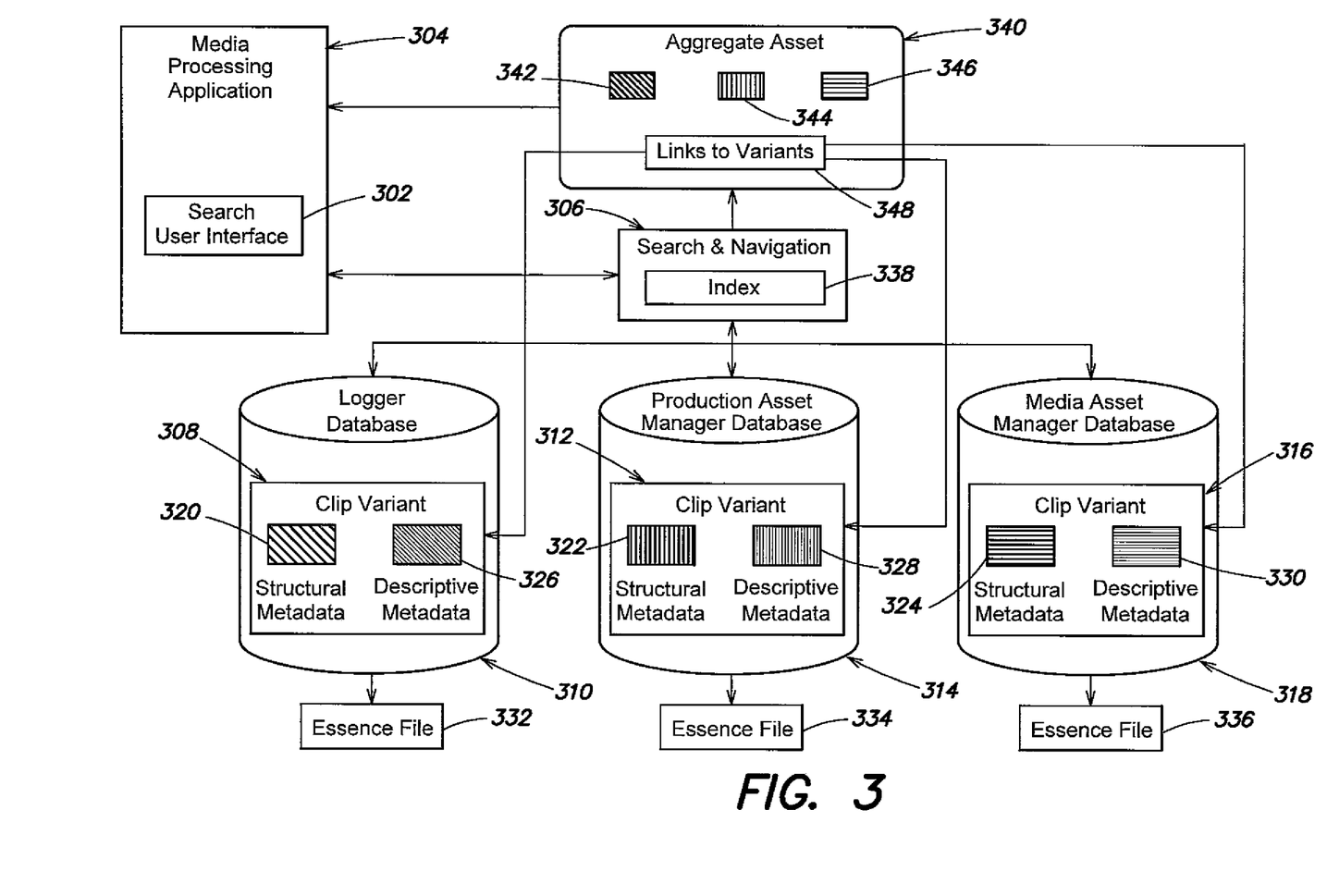
FIG. 3 is a high-level block diagram of the use of aggregate assets to group individual variants in response to a search query.

FIG. 3 illustrates the use of the aggregate asset in a production environment. A user performs a search for a clip by entering one or more search terms into search user interface 302. The search user interface may run within a Web browser window, either separately or appearing within the user interface of the user's media processing application 304. The search user interface is in two-way data communication with search and navigation back end 306. In the illustrated example, three variants of an asset responsive to the search exist as clip variant 308 in logger database 310, clip variant 312 in production asset manager database 314, and clip variant 316 in media asset manager database 318. Each variant has its own metadata, illustrated in the figure as structural metadata 320, 322, and 324, and descriptive metadata 326, 328, and 330, and includes a reference to its corresponding media essence file 332, 334, and 336. The search request from search user interface 302 is sent from the search application to search and navigation back end 306 implemented on a shared remote server, which maintains asset index 338. In order to keep the index current, each of the database systems within the production environment includes an agent that listens for changes. When an asset is updated, added, or removed, the agent sends a message specifying what has changed to the search and navigation back end index, which updates its index accordingly. Other index maintenance methods, such as a periodic request for updates may be used to keep the index current.

Using search user interface 302, the user may enter a search request using one or more of the fields contained with the entries of index 338. The choice of index fields is optimized for search purposes, and includes a field for asset name, and usually also creation date, topic, key words, and linkage key. In response to receiving the search request, search and navigation back end 306 consults index 338 and finds entries responsive to the search term. For example, if the user searches by asset name, all assets having the searched name are returned. In the example illustrated in FIG. 3, the set of assets responsive to the search include three clip variants 308, 310, and 312 that all share a common link key. The system retrieves metadata from some or all of the variants in accordance with a mapping template that indicates what metadata is to be retrieved, and if an attribute exists in more than one variant, which variant is to be prioritized. It then assembles aggregate asset 340 that contains copies of at least a portion of the descriptive metadata retrieved from at least one of the variants that share the common link key, shown as descriptive metadata 342, 344, and 346 copied from clip variants 308, 310, and 312 respectively. It also copies into the aggregate asset links to each of the variants 348.

As mentioned above, the values of given metadata field of the variants of an aggregate asset may vary from one variant to another. If the search request uses a field whose value differs from one variant to another, the search results may not find certain variants. For example, if asset name is used for searching, and a production asset manager variant has a different name from a media asset manager variant, only one of the two variant names may match the search term, and only that one will be returned. To locate variant assets potentially missed in this manner, a second step of search may be conducted by linkage key, using each of the linkage keys contained within assets returned by the search. To save unnecessary searching, this second step only needs to be performed for an asset selected by the user from the search results. If the selected asset includes a linkage key, i.e., it is an aggregate asset, that key is used to search all the available databases for additional variants, and any unlocated variant members of the aggregate will be located. The user's media processing application is able to access automatically any variant returned at any stage of the searching.

In another search mode, a user is already working with an asset variant, and wishes to ensure it is archived by a media asset management system. The user performs a search using the linkage key of the variant, and, if a media asset management variant is returned, the user determines that the asset is already archived, there is no need to store another copy of such a variant.

Aggregate asset 340 is returned to the search application, along with any other assets, simple or aggregate, that are responsive to the search. For each returned aggregate asset, the search UI displays information contained within the copied descriptive metadata within the aggregate asset. If the user wishes to read or process the aggregate asset, the user's application automatically access the link within the aggregate asset to the clip variant corresponding to application being used. For example, if the user wishes to use the asset with a video editing system, the variant stored in production asset manager database 314 is automatically selected and read. The user may not even be aware that there are other variants of the asset available. If, on the other hand, there is no variant represented within the aggregate asset corresponding to the type of asset accessible by the user's application, the user's application may attempt to import a variant corresponding to a different application, thus creating a new variant compatible with the user's application. The ability to perform such a conversion depends on the specifics of the media formats involved. For example, a video editing system that is seeking and not finding a compatible version stored in a production asset management system may be able to import a variant stored on the media asset management system if the media is encoded with a common encoding scheme, such as QuickTime® or Avid DNxHD®. However, specialized formats cannot usually be imported by a video editing system. If conversion is not possible and there is no variant compatible with the user's application, the user is informed that no suitable asset has been found.

In the described embodiment, search user interface 302 runs on a client computer system, typically within a Web browser. The client computer may also host media processing application 304 being used by the user performing the asset search, such as a video editing application, a digital audio workstation, a newsroom system, a graphics system, or a special effects system. In some embodiments, the media processing application is hosted in the Cloud, and the client just hosts a user interface for the application. As indicated in FIG. 3, the search user interface may be shown as part of the media processing application. The server system hosting the search and navigation back end 306 may be located on the same premises as the user, or may be deployed in the Cloud. The client system may interact with individual asset databases selected by the user or a set of databases belonging to a cluster, or may automatically perform global searches that include all the linked systems in a given production environment. The various databases may be hosted by systems on the premises, or may be deployed in the Cloud. The essence files to which the assets stored in the various databases point are also stored on local shared storage on-premises or in the Cloud. Business logic running on the search and back end server creates and temporarily stores the aggregate assets formed during the course of searching, places it in a cache, and sends it to the search user interface over the network.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable.

A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The computer system may be deployed in the Cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of responding to a media search request from a user of a media processing application, the method comprising:
   in response to a search query entered by a user of the media processing application, searching a plurality of systems within a media production environment;
   locating a plurality of media assets that are responsive to the search query, wherein the plurality of located media assets includes a first asset including a first linkage key stored on a first system of the plurality of systems, and a second asset including a second linkage key stored on a second system of the plurality of systems;
   comparing the first linkage key with the second linkage key, and, if the first linkage key is the same as the second linkage key, grouping the first asset and the second asset into an aggregate asset wherein the aggregate asset includes:
      the first linkage key;
      links to the first asset and to the second asset; and
      a copy of at least a portion of descriptive metadata included within at least one of the first asset and the second asset; and
   including the aggregate asset within search results presented to the user that are responsive to the media search request, wherein the aggregate asset is represented within the search results by the copied portion of the descriptive metadata; and
   wherein in response to a request from the user to access the aggregate asset, the media processing application automatically accesses the first asset.

2. The method of claim 1, wherein the plurality of systems within a production environment include at least two of a media asset management system, a production asset management system, and a data logging system.

3. The method of claim 1, wherein content represented by at least one track of the second asset is the same as content represented by at least one track of the first asset.

4. The method of claim 1, wherein the at least one track of the first asset represents video of the represented content and the at least one track of the second asset includes audio of the represented content.

5. The method of claim 1, wherein a number of tracks of the first asset is the same as a number of tracks of the second asset, and each track of the first asset represents the same content that is represented by a corresponding track of the second asset.

6. The method of claim 3, wherein an encoding scheme of the second asset is different from an encoding scheme of the first asset.

7. The method of claim 3, wherein a compression of the second asset is different from a compression of the first asset.

8. The method of claim 3, wherein a metadata schema of the second asset is different from a metadata schema of the first asset.

9. The method of claim 3, wherein the second system is different from the first system.

10. The method of claim 1, wherein the search results presented to the user include at least one asset that does not represent an aggregate asset.

11. The method of claim 1, wherein the media processing application automatically accessing a compatible one of the first asset and the second asset includes:
   using the link to the first asset included within the aggregate asset to access the first asset and to determine whether a metadata schema of the first asset is compatible with the media processing application;
   if the metadata schema of the first asset is compatible with the media processing application, automatically selecting and accessing the first asset; and
   if the first asset is not compatible with the media processing application:
      using the link to the second asset included within the aggregate asset to access the second asset and to determine whether a metadata schema of the second asset is compatible with the media processing application; and
      if the metadata schema of the second asset is compatible with the media processing application, automatically selecting and accessing the second asset.

12. The method of claim 1, wherein a given metadata field is present in both the first asset and the second asset, further comprising:
   accessing a mapping template that specifies a priority order for copying values of the given metadata field from individual assets into an aggregate asset; and
   determining whether the copied at least a portion of the descriptive metadata included within at least one of the first asset and the second asset is to be copied from the first asset or to be copied from the second asset in accordance with the priority order specified by the mapping template.

13. The method of claim 12, wherein the given metadata field is an asset name.

14. The method of claim 13, wherein the priority order specified by the mapping template specifies that an asset name of an asset stored in a media asset management system is copied as a first priority.

15. The method of claim 13, wherein the priority order specified by the mapping template specifies that if an asset management system is not present within the media production environment, an asset name is to be copied from a production asset management system.

16. A method of responding to a media search request in a media production environment comprising a plurality of systems, the method comprising:
   receiving a media search query from a user of a media processing application;
   in response to receiving the media search query, searching the plurality of systems;
   locating a plurality of media assets stored on the plurality of systems that are responsive to the search query, wherein the located plurality of media assets includes:
      a first variant media asset that includes a linkage key; and
      a second variant media asset that includes the linkage key and represents at least a portion of content represented by the first variant media asset;
   grouping the first variant media asset and the second variant media asset into an aggregate asset, wherein the aggregate asset includes:
      the linkage key;
      links to the first variant media asset and to the second variant media asset; and
      a copy of at least a portion of descriptive metadata included within at least one of the first variant media asset and the second variant media asset;
   including a representation of the aggregate asset among search results returned to the user, wherein the representation includes the copied descriptive metadata; and
   wherein in response to a request from the user to access the aggregate asset, enabling the media processing application to automatically:
      if at least one of the first variant asset and the second variant asset is compatible with the media processing application, select and access one of the first variant asset and the second variant asset that is compatible with the media processing application; and
      if neither the first variant asset nor the second variant asset is compatible with the media processing application, provide an indication to the user that no compatible asset corresponding to the aggregate asset has been found.

17. The method of claim 16, further comprising:
   using the linkage key to search the plurality of systems, locating a third variant media asset stored on the plurality of systems, wherein the third variant asset includes the linkage key and represents at least a portion of the content represented by the first variant media asset; and
   grouping the third variant media asset with the first variant media asset and the second variant media asset into the aggregate asset.

18. The method of claim 17, wherein the third variant media asset is compatible with the media processing application and further comprising enabling the media processing application to access the third variant media asset automatically.

19. A computer program product comprising:
   non-transitory computer-readable storage with computer program instructions stored thereon, wherein the computer program instruction, when processed by a computer, instruct the computer to perform a method of responding to a media search request from a user of a media processing application, the method comprising:

in response to a search query entered by a user of the media processing application, searching a plurality of systems within a media production environment;

locating a plurality of media assets that are responsive to the search query, wherein the plurality of located media assets includes a first asset including a first linkage key stored on a first system of the plurality of systems, and a second asset including a second linkage key stored on a second system of the plurality of systems;

comparing the first linkage key with the second linkage key, and, if the first linkage key is the same as the second linkage key, grouping the first asset and the second asset into an aggregate asset wherein the aggregate asset includes:
  the first linkage key;
  links to the first asset and to the second asset; and
  a copy of at least a portion of descriptive metadata included within at least one of the first asset and the second asset; and including the aggregate asset within search results presented to the user that are responsive to the media search request, wherein the aggregate asset is represented within the search results by the copied portion of the descriptive metadata; and wherein in response to a request from the user to access the aggregate asset, the media processing application automatically accesses one of the first asset and the second asset that is compatible with the media processing application.

* * * * *